(12) United States Patent
Adamson (10) Patent No.: US 7,580,899 B2
(45) Date of Patent: Aug. 25, 2009

(54) OFFLINE CODE BASED RELOADING SYSTEM

(75) Inventor: Richard I. C. Adamson, Toronto (CA)

(73) Assignee: Coinamatic Canada Inc., Mississauga, Ontario (CA)

( * ) Notice: Subject to any disclaimer, the term of this patent is extended or adjusted under 35 U.S.C. 154(b) by 158 days.

(21) Appl. No.: 11/674,188

(22) Filed: Feb. 13, 2007

(65) Prior Publication Data

US 2007/0130087 A1    Jun. 7, 2007

Related U.S. Application Data

(62) Division of application No. 10/462,520, filed on Jun. 16, 2003, now Pat. No. 7,216,105.

(30) Foreign Application Priority Data

May 30, 2003    (CA)    .................................... 2430456

(51) Int. Cl.
    *G06Q 20/00*    (2006.01)
(52) U.S. Cl. .............................. 705/77; 705/66; 705/64; 235/375; 235/380; 235/381
(58) Field of Classification Search ........................ None
    See application file for complete search history.

(56) References Cited

U.S. PATENT DOCUMENTS

| | | | |
|---|---|---|---|
| 5,884,292 A | 3/1999 | Baker et al. | |
| 5,892,900 A | 4/1999 | Ginter et al. | |
| 5,917,168 A | 6/1999 | Nakamura et al. | |
| 5,936,221 A | 8/1999 | Corder et al. | |
| 5,949,880 A * | 9/1999 | Curry et al. | .................... 705/66 |
| 6,167,387 A | 12/2000 | Lee-Wai-Yin | |
| 6,298,336 B1 | 10/2001 | Davis et al. | |
| 6,356,881 B1 | 3/2002 | Milch et al. | |
| 6,422,459 B1 | 7/2002 | Kawan | |
| 6,422,462 B1 | 7/2002 | Cohen | |

FOREIGN PATENT DOCUMENTS

WO    01/97184    12/2001

OTHER PUBLICATIONS

"American Express: American Express and 7-11 team up to offer prepaid Internet card" M2 Presswire. Coventry: Jun. 26, 2000. p. 1.*

(Continued)

*Primary Examiner*—Calvin L Hewitt II
*Assistant Examiner*—Mohammad A Nilforoush
(74) *Attorney, Agent, or Firm*—Pearne & Gordon LLP (57) ABSTRACT

An offline code-based reload device and method for adding value to a reconfigurable memory storage means in a portable storage medium. Reload is effected using a reload device not directly connected by telephone or any other communication network to a value supplier. The system uses a "one time use number" ("OTN") generated by a computer program containing an algorithm containing information on the value to be added and a transaction sequence number ("TSN"). Upon presentation of the portable storage medium to the reload device and entry of the OTN into a numeric keypad, the reload device decodes or disassembles the OTN to verify its authenticity, validate that it was created for the specific portable storage medium presented to the reload device and to verify through the TSN that the OTN has not been previously used to add value from the receiving reload device or any other reload device. The reload device further extracts the value from the OTN, adds the value to a selected purse on the portable storage medium and loads a new TSN to the portable storage medium.

6 Claims, 11 Drawing Sheets

OTHER PUBLICATIONS

"Oberthur Smart Cards Launches the O'scratch Prepaid Card; Oberthur Smart Cards Extends Its Telephone Card Product Range With a Global Prepaid Solution" Business & Retail Editors/Telecommunications Writers. Busines Wire. New York: Aug. 25, 1999. p. 1.*

Card Associations Move Closer to Standardizing Chip Cards (Card News, vol. 9, No. 12, p. N/A, Jun. 27, 1994, Copyright 1994 Phillips Business Information, Inc.).

Transmit Smart Cards Are Ready to Roll (Motorola and ERG partner to offer smart card systems to transmit agencies around the world to meet growing demand for chip-based fare collection systems) Card Technology, p. 41+, Sep. 1999.

* cited by examiner

PORTABLE STORAGE MEDIUM MEMORY ALLOCATION

OFFLINE CODE BASED RELOADING SYSTEM

CROSS-REFERENCE TO RELATED APPLICATION

This application is a division of U.S. patent application Ser. No. 10/462,520 filed Jun. 16, 2003, which is incorporated herein by reference in its entirety.

FIELD OF THE INVENTION

This invention relates generally to a low cost means of adding value to portable media such as "smart cards" of microprocessor or encrypted memory types, key fobs, magnetic stripe cards or any other form factor that permits electronic read/write functions that can be used to replace coins in exact change payments of small amounts spent by a consumer.

BACKGROUND OF THE INVENTION

Traditionally, exact change micropayment transactions such as vending machines, pay-for-use laundry machines, pay telephones and public transit access were facilitated through the use of coins. A user would obtain a sufficient number of coins or tokens of the correct denomination to obtain the desired product or service. Bill changers were sometimes provided but are expensive to install and maintain, and are prone to burglary with the result that coins are not generally available to the public at the place where the exact change micropayment transaction is to take place.

In recent years alternatives to coins for micropayments have been developed to reduce the nuisance of carrying or searching for exact change. These alternative payment forms have typically been such media as disposable smart cards or magnetic swipe cards. These media typically have a preloaded value when purchased from a vendor. There are major disadvantages with these micropayment media. The first disadvantage with these micropayment reload devices is to the user. With prepaid/preloaded cards, the user must purchase cards in fixed cash increments creating the problem of having residual non-useable value left on the media, depending on the vend rate for the desired product or service. The media is disposable which adds cost to the issuer. There are also additional costs associated with distribution, most notably, payments to retail vendors for distributing such media and security issues with cards that have preloaded value.

Reloadable microchip media such as smart cards and key fobs, and encrypted magnetic media such as swipe cards have the potential of overcoming all of these problems with a number of additional benefits including the ability to load non-preset or fixed amounts, facilitating a low cost means of granting repayments of error amounts or lost amounts thereby saving the costs of mailing small refund cheques and placing additional applications such as loyalty programs on the media.

Historically the replacement of coins by reloadable smart cards and other electronic micropayment media has been prohibitively expensive due to the high cost of reload devices such as currency acceptors to media and credit/debit card acceptors to media. The high cost of such reload devices has limited their availability resulting in a lack of infrastructure to support the widespread adoption of reloadable micropayment media.

Currency acceptors are high cost, armoured, mechanical reload devices prone to breakage and counterfeit money and carry substantial risks of burglary and vandalism. They must be placed in high security locations and the funds accumulated in the boxes need to be collected, counted and presented to banks in a secure environment at considerable cost.

Debit/credit card reload devices while lower in cost than currency acceptors initially carry the ongoing costs of networking to telephone or other remote communications systems in order to validate the financial transactions. In addition, these are not usable by people who have neither credit nor debit account facilities or balances with financial institutions.

Realizing these disadvantages in the deployment of reloadable micropayment reload devices the present invention provides such loading services in a completely offline environment thus reducing the capital necessary to deploy reload devices in adequate numbers to convenience the user. In addition to the added convenience the user will also have the ability to load non-fixed amounts if so desired. Such a reload device has the added benefit of enabling the issuing organization to grant refunds to their media using customers, saving the additional costs of mailing refund cheques to users who have substantiated refund claims further adding convenience to customers.

SUMMARY OF THE INVENTION

A method for a value supplier to transfer value to an electronic purse possessed by a holder without requiring direct electronic communication between said value supplier and said medium, said method comprising the steps of:
(i) providing a portable storage medium to said holder having a Card Identification Code ("CIC"), a machine readable and reconfigurable Transaction Sequence Number ("TSN") storage area and at least one said purse wherein each said purse is a machine readable and reconfigurable storage means and has a unique purse address;
(ii) recording said TSN against said CIC in a reconfigurable data storage and retrieval system;
(iii) receiving a request from said holder including said CIC, a desired value and payment instructions;
(iv) determining said TSN stored in said data storage and retrieval system against the CIC presented in step (iii);
(v) using an encryption algorithm to generate a unique One Time Number ("OTN") based on said CIC, said TSN, said purse address and said desired value;
(vi) presenting said OTN to said user;
(vii) reconfiguring said TSN in said storage and retrieval system to vary said TSN by a predetermined increment;
(viii) providing a reload device having a reader for reading said TSN and CIC from said portable storage medium, CIC input means for receiving said CIC on said storage medium, OTN input means for receiving said OTN from said holder, a decrypter having a decryption algorithm corresponding to said encryption algorithm in step (v) for decrypting said OTN, a verifier for verifying that said CIC and TSN on said storage medium match said OTN input by said holder and a loader for loading value into said purse corresponding to said desired value;
(ix) receiving said storage medium in said reloader;
(x) determining said CIC and said TSN on said storage medium and receiving said desired value and said OTN;
(xi) decrypting said OTN using said decryption algorithm;
(xii) verifying whether said CIC and TSN components of said OTN conform to said CIC and said TSN on said storage medium;

(xiii) if said verifying in step (xii) determines conformance, loading said desired value into the purse identified by said purse address and incrementally adjusting said TSN on said storage medium by said predetermined increment in step (vii); and, (xiv) if said verification in step (xii) fails to determine conformance, causing said reloader to display an error message.

The method may include the further steps of:

(xv) configuring said reload device to monitor a predetermined number of retries of steps (ix) through (xii) for a given of said storage medium and, should said predetermined number of retries fail to yield a determination of said conformance, to enter a "disabled" indicator on said storage medium; and, (xvi) further configuring said reload device to check for said disabled indicator and if detected, cease carrying on with the transaction steps and to display an error message to said holder.

The payment instructions received in step (iii) may include payment issuer information and may be confirmed with the issuer prior to continuing. Should payment be refused by the payment issuer the cardholder may be notified accordingly.

A reload device is provided for a portable value storage medium ("medium"). The reload device has a medium reader for reading a stored transaction sequence number ("TSN") stored on the medium, a CIC input means for receiving a presented Card Identifier Code ("CIC") and an OTN input means for receiving an One Time Number ("OTN") containing encrypted TSN, CIC and value components and purse address. The reload device further has a decoder for decoding the OTN to determine the encrypted TSN, CIC and value components. The reload device also has a comparator communicating with the medium reader, CIC input means, OTN input means and decoder for comparing at least the encrypted TSN and CIC with the stored TSN and presented CIC. A loader communicates with the comparator for loading value onto the medium corresponding to the value. The comparator is configured to only load the value if the encrypted TSN and CIC components accord with the stored TSN and presented CIC. The reload device also has a TSN updater for updating the stored TSN to a next sequential TSN.

The reload device may have a security means associated with the reloader and the comparator. The security means may disable the medium upon detecting a predetermined number of unsuccessful OTN inputs against a particular CIC, causing an error message to be presented to a holder of the medium seeking to add value thereto.

A security means may, after the unsuccessful OTN inputs place a restriction on the card against further use. The medium reader may read any such restriction and notify the comparator to disable the storage medium without requiring any further unsuccessful attempts.

An OTN generator is provided for generating a One Time Number ("OTN") for subsequent offline use with any of the issuing organization's loaders for loading a predetermined value onto a storage medium having a Card Identifier Code ("CIC") and a reconfigurable stored Transaction Sequence Number ("TSN"). The OTN generator has a database for storage and retrieval of information on account status, CIC's for issued cards and the current TSN associated with each CIC. The OTN generator further has a system processor communicating with the database and access means associated with the processor for oral or written communication between a holder of the medium and the OTN generator. The OTN generator further has input means associated with the access means for receiving the CIC, a desired amount and type of value to be processed and a purse address. Debit means may be associated with a system processor for debiting the source of funds by an amount corresponding to the desired amount of value. Verification means may be associated with a system processor for determining whether the source of funds identified by the holder of the medium is in good standing. An encrypter may be associated with the system processor for generating the OTN according to an encryption algorithm based on at least the CIC, the TSN, the desired value and purse address. The processor may be configured to provide an error message if the account is not in good standing. The processor may be configured to signal the encrypter to generate a valid OTN and to communicate the valid OTN to the holder. The holder is thus able to input the OTN into the reloader for decryption and for the reloader to write a value onto the medium. The processor may further be configured to update the database to adjust the TSN associated with the CIC by a predetermined increment after generating a valid OTN.

The access means of the OTN generator may communicate over at least one of a computer and a telephone network. The input means of the OTN generator may be a telephone handset or a computer keyboard. The OTN generator output may be electronic via speech generator or written to a display screen or a document generator.

DESCRIPTION OF DRAWINGS

Preferred embodiments of the present invention are described below with reference to the accompanying illustrations in which.

DESCRIPTION OF PREFERRED EMBODIMENTS

Figure 1:
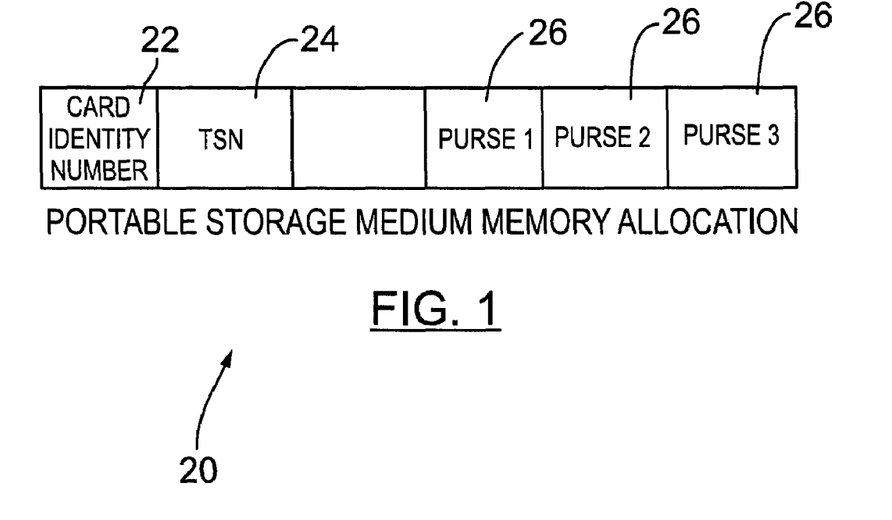
FIG. 1 is a pictorial representation of a storage medium according to the present invention.

A storage medium according to the present invention is generally indicated by reference 20 in FIG. 1. The storage medium 20 may be a magnetic stripe card although other configurations, such as a microchip contained in a card, a key fob or other physical carrier may be utilized.

The storage medium 20 has a card identification code 22 ("CIC 22") unique to that storage medium 20.

The CIC 22 would generally be user readable as the users would be required to recite it as part of the transaction described below.

The storage medium 20 has an area 24 which is machine readable and reconfigurable on which is stored a Transaction Sequence Number ("TSN"). The storage medium further has at least one area referred to as a "purse" 26 which is a reconfigurable storage means to which value may be added and from which value may be removed. The purse 26 may be part of the area 24 or an adjunct thereto. Each purse 26 would have a unique address associated with it. The address would have to be accessed to load each purse 26.

In use, the storage medium 20 may be issued to a holder (reference 208 in FIG. 10) by a value supplier. The holder 208 can then contact the value supplier and, as discussed in more detail below, arrange to have value added to the purse 26. The value is added using a reload device 50 in FIG. 2. The reload device and the value supplier in effect communicate via an encrypted code (i.e. the One Time Number ("OTN")) using the holder 208 as an intermediary rather than through direct electronic communication.

The storage medium 20, once loaded, may be utilized to transfer at least a portion of the value to a storage medium reader such as a vending machine, a washing or drying machine, a telephone, a transit system or other users where preferably cashless small transactions are required. As different users may have different purse requirements, more than one purse 26, each satisfying different user requirements, may be provided. For example a transit pass may be configured in terms of "passes" with one pass required per ride rather than having a monetary value which is debited by a medium reader. The expression "value" should therefore be broadly interpreted to include other than actual cash values loaded.

Figure 2:
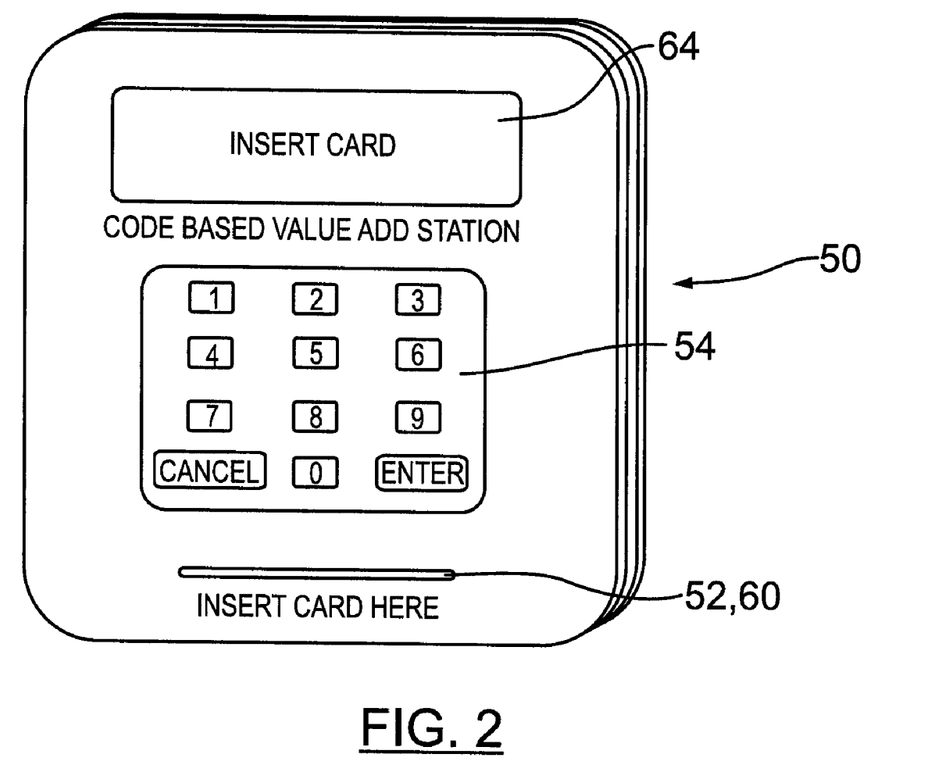
FIG. 2 is a perspective view illustrating a reload device according to the present invention.
Figure 3:
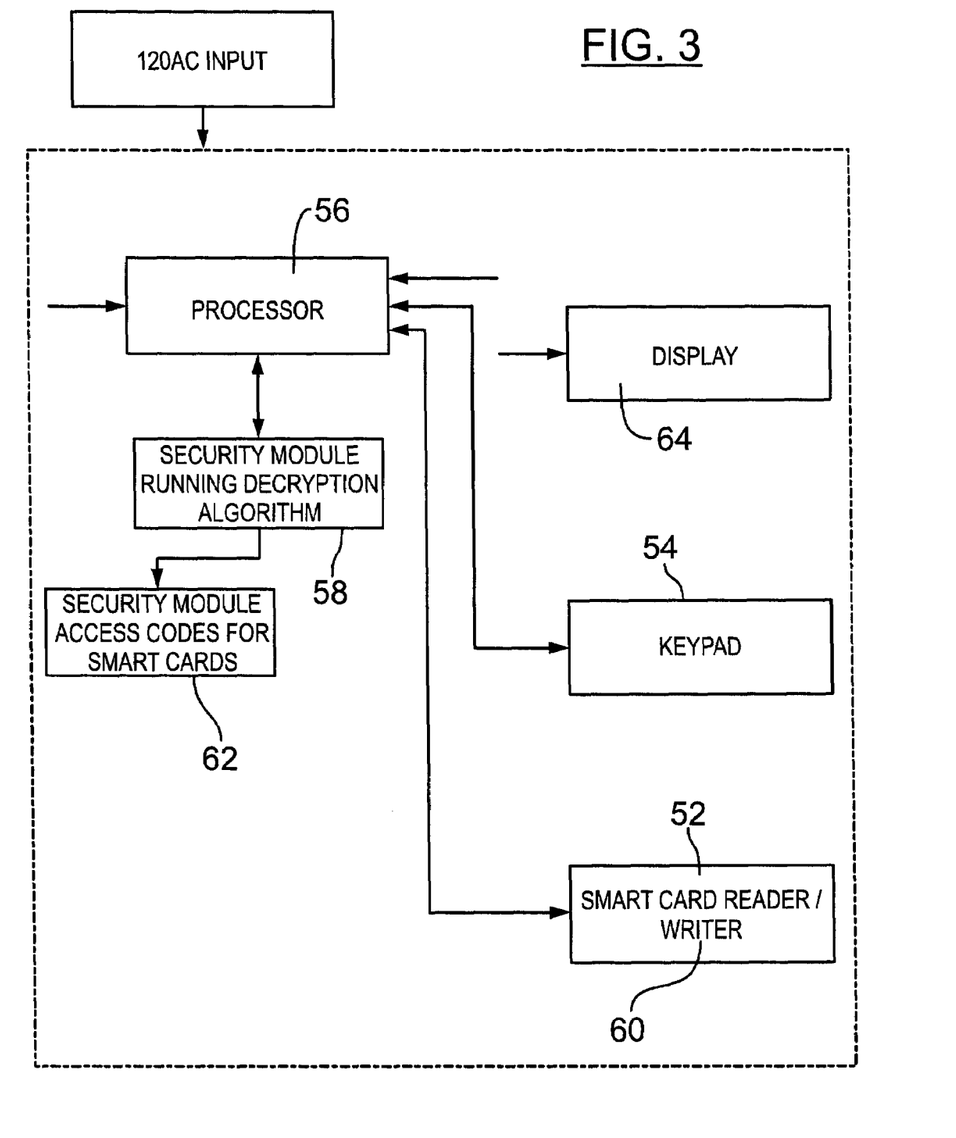
FIG. 3 is a device functional block diagram of the reload device.

FIG. 2 is a pictorial representation illustrating a reload device 50 according to the present invention. FIG. 3 is a device functional block diagram of the reload device 50.

The reload device 50 includes a medium reader 52 for reading information stored on the storage medium 20, in particular the TSN on the area 24 and preferably also the purse 26.

The reload device 50 further has a CIC input means such as the keypad 54 for receiving the CIC 22. While a keypad 54 is illustrated, alternative means may be utilized. For example the CIC may be both printed on the card and stored on the card in machine readable form in which case the medium reader 52 may also be configured to act as the CIC input means.

The reload device 50 has an OTN input means for receiving the OTN. The OTN input means may be the keypad 54. The OTN is an encrypted code based on the TSN, the CIC and value components. The OTN may also contain a purse identifier component such as a purse address. The OTN is in effect the message carried by the holder of the storage medium from the value supplier to the reload device 50 which enables verification of the storage medium 20 and loading of value into the purse 26.

As the OTN is an encrypted message to the reload device 50, the reload device 50 includes a decoder 55 which may be a reload processor 56 communicating with a first security module 58 which runs a decryption algorithm. The decoder 55 receives the OTN and determines the TSN, CIC and value components.

The reload device 50 also has a comparator for comparing the CIC and TSN input or read from the storage means 20 with the TSN and CIC determined by the decoder 55. This may for example be accomplished by suitably configuring the reload processor 56 and having it communicate with the keypad 54, medium reader 52 and first security module 58. "Suitably configuring" refers to providing appropriate hardware and software either as part of or in communication with the reload processor 56.

The comparator determines whether the information contained in the OTN accords with the TSN and CIC on the storage medium 20. If it does, then the comparator instructs, such as through the reload processor 56, a loader 60 to add the value to the appropriate purse 26. If it doesn't then the comparator may simply refuse to instruct the loader 60 but more preferably will arrange for an error message to be presented to the holder of the storage means 20. This may be accomplished by communicating the non-accord condition to the reload processor 56 which in turn instructs a display 64 also in communication therewith to display the error message.

The reload device 50 is also provided with a TSN updater for updating the TSN after each successful transaction. This may form part of the loader 60. The TSN is updated for example by a predetermined increment or to a next predetermined sequential value after each successful transaction. This prevents the storage medium 20 from being loaded again using the same OTN. The reason it can't be loaded again is that the updated TSN will not accord with the encrypted TSN resulting in a non-accord determination by the comparator.

The reload device 50 may incorporate further security features for example a second security module 62 may communicate with the reload processor 56 to provide access codes enabling the reload processor 56 to communicate with the medium reader 52, keypad 54 and possibly also the first security module 58.

Additionally, the reload 50 processor 56 may be configured to monitor subsequent unsuccessful attempts to load value such as may be the case if someone is attempting to guess an OTN. The area 24 or any other area of the storage medium 20 which is machine readable may then be loaded with a "security lock-out" notation which can be detected by the medium reader 52 and communicated to the reload processor 56. The reload processor may be further configured to disable the storage medium 20 and cause the display 64 to present a suitable error message. The restriction on reloading may be time limited.

Alternatively, once a security lock-out notation is placed on the storage medium 20, the system can be configured to require entry of a one time "release" code to be provided by the value supplier in order to remove the security lock.

On occasion it may be necessary to resynchronize the TSN on the storage medium 20. This might for example occur as a result of a system malfunction. Accordingly the reload processor 56, decoder 55 and loader 60 may be configured to allow the keypad to present a coded TSN to the reload processor 56 for decoding by the decoder 55 and loading onto the storage medium 20 in lieu of any previously loaded TSN.

Figure 4:
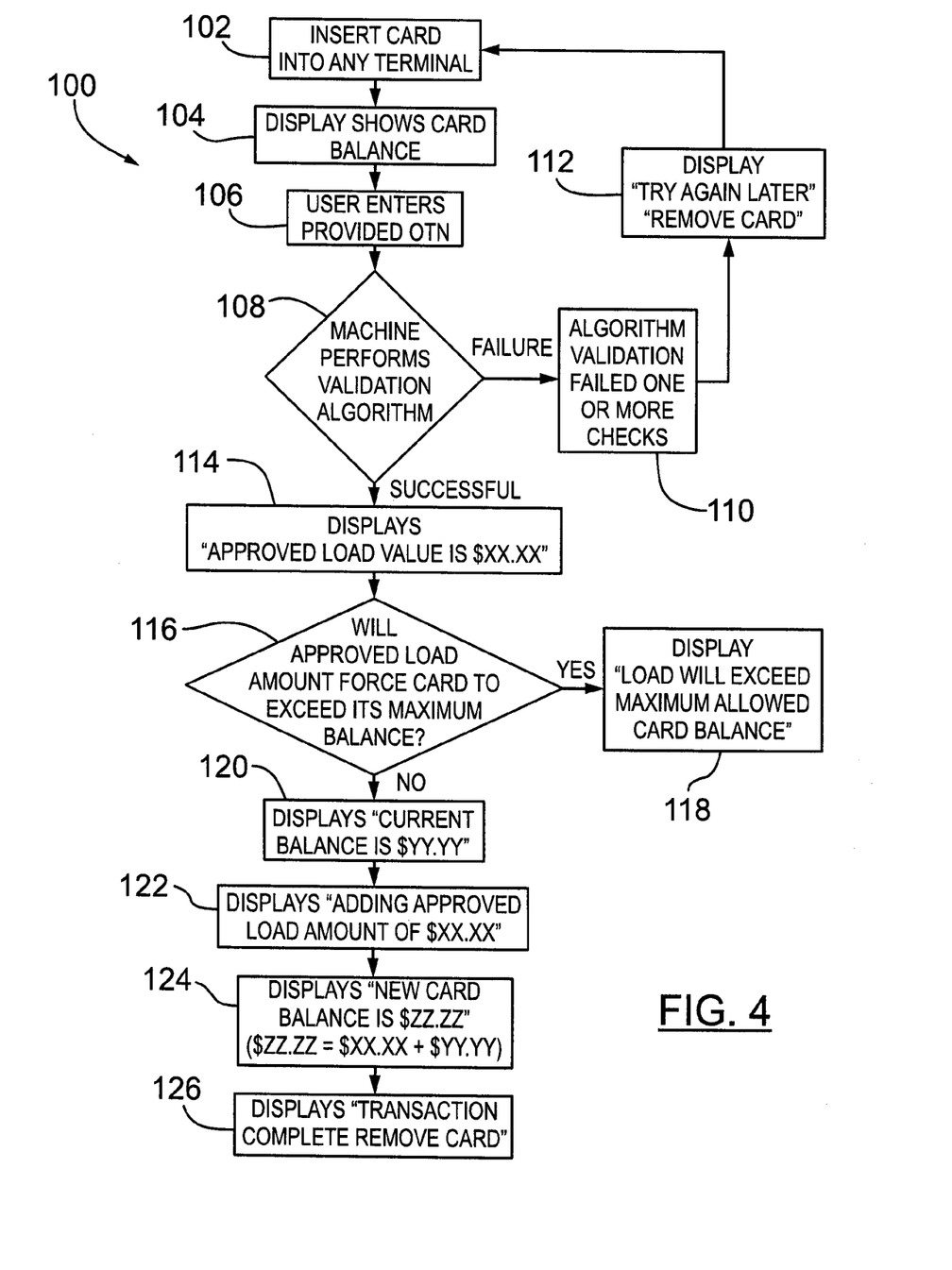
FIG. 4 is a device level transaction flow chart for the reload device.

FIG. 4 is a device level transaction flowchart 100 for the reload device 50 illustrating user interaction with the device. Box 102 corresponds to the user inserting the storage medium 20 into the medium reader 52 and the medium reader 52 reading the storage medium 20. Box 104 depicts the display 64 showing the balance on the card. Alternatively the display 64 could prompt for the OTN and also the CIC if the CIC isn't read by the medium reader 52. Box 106 represents the user entering the OTN on the keypad 54.

The reload device 50 next performs a validation algorithm at box 108 which is performed by the comparator. Should the validation result in failure as depicted by box 110, an error message is displayed as depicted by box 112. Should the validation prove successful, the display 64 may be instructed to display an approved load value as depicted by box 114.

The reload processor 56 may also be configured to determine whether the approved reload amount will exceed a predetermined maximum balance in the selected purse 26. This is depicted by box 116. Should this occur, the display 64 may be caused to present such a message as depicted by box 110 and further prompt the holder to remove the storage medium 20 from the reload device 50, as depicted by box 112.

Should the selected purse 26 be capable of accepting the approved load value the reload processor 56 may instruct the display 64 to display the current balance (box 120) and instruct the loader 60 to load the approved value into the selected purse 26 as depicted by box 122. The reload processor 56 may then calculate and cause the display 64 to present first the new balance (box 124) and finally cause the display 64 to display a message, such as at box 126, informing the holder that the transaction is complete and prompting the holder to remove the storage means 20 from the reload device 50.

Figure 5:
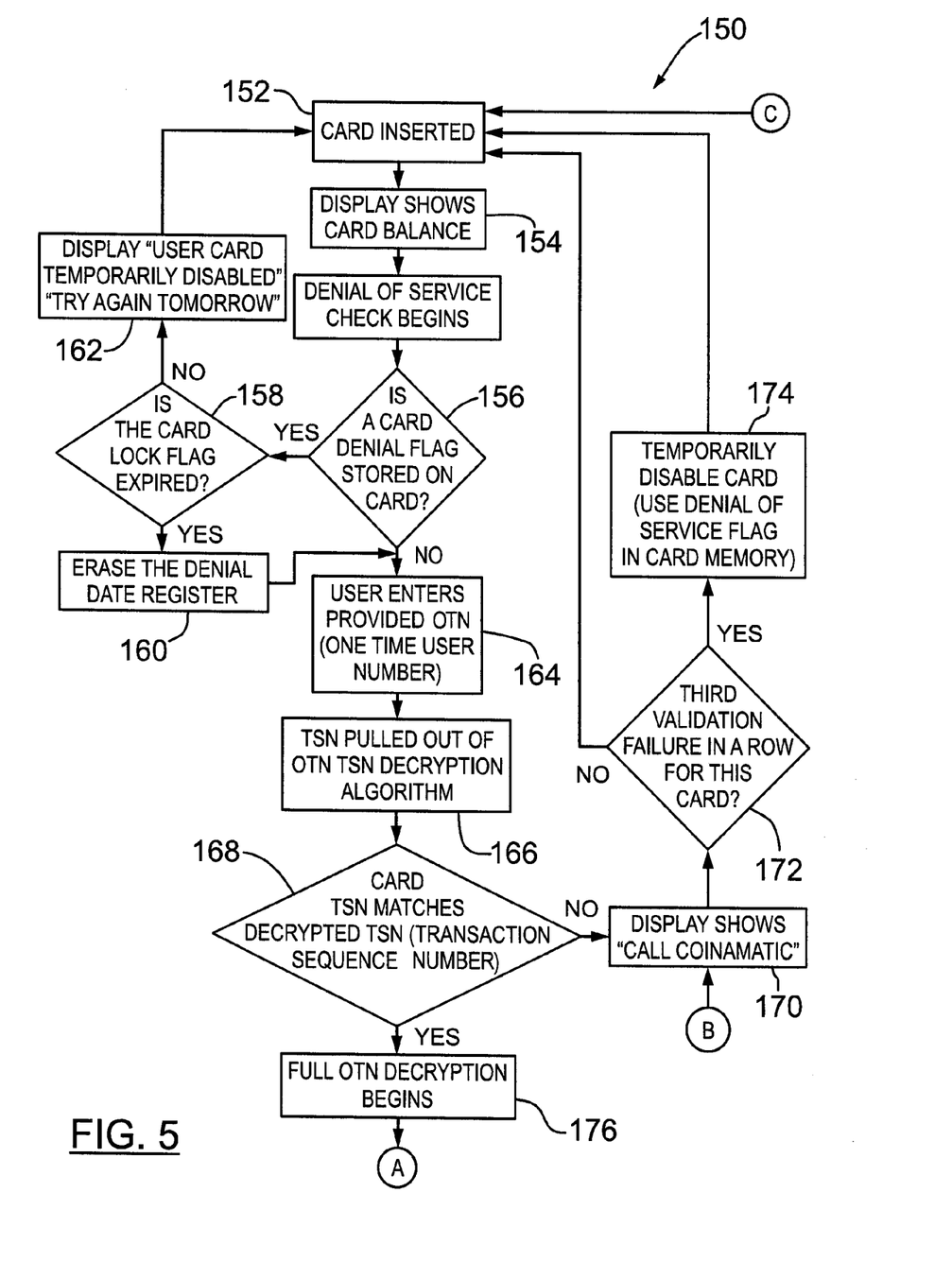
FIGS. 5 and 6 are a flow chart in two parts illustrating a device level transaction flow algorithm in accordance with the present invention.
Figure 6:
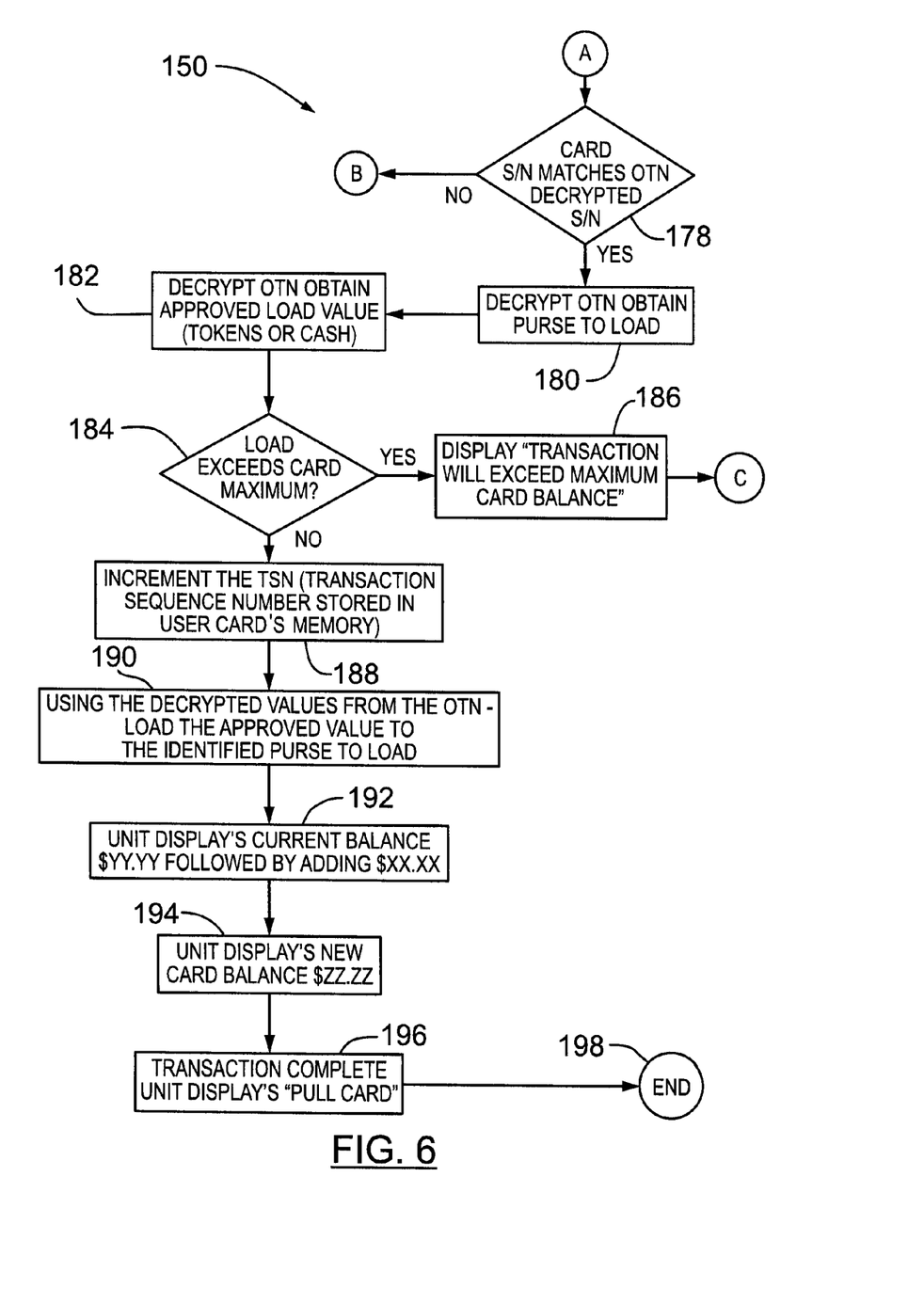

FIGS. 5 and 6 are a flow chart in two parts illustrating a device level transaction flow algorithm 150 in accordance with the present invention.

At reference 152 the storage medium 20 is presented to the medium reader 52. At reference 154 the display 64 shows any remaining balance on the card. The reload device next, at reference 156, determines if any security lock-out is active on the card. If a security lock-out is active, then, at reference 158 the reload device 50, typically through its reload processor 56 determines if the security lock-out has expired. If it has expired, then at reference 160, it is erased, If it hasn't expired, then at reference 162 the display 64 is operated to present an appropriate message. This assumes that a time sensitive security lock-out is being used, which may not be the case. The system may be configured to require that a one time code be obtained from the value supplier in order to remove the security lock-out.

If a security lock-out is either not present or has expired the reload device 50 accepts a user entered OTN at reference 164. The reload processor 56 extracts the TSN from the OTN at reference 166. The comparator at 168 compares the decrypted TSN with the TSN read off of the storage medium 20 by the medium reader 52. A failed match causes the display 64 to present an appropriate message at reference 170. Next at reference 172, the reload processor 56 determines whether a predetermined sequential retry threshold has been achieved. If not the storage medium may be reinserted at 152. If it has been achieved then a security lock-out, which may be time sensitive, is placed on the storage medium 20 at reference 174, at least temporarily disabling the storage medium 20 from operating the reload device 50.

It will be appreciated that presence of a security lock-out disables the storage means 20 from being used with any reload device 50. This is because the security lock-out is carried by the storage means 20 rather than by the reload device 50.

If no security lock-out is currently active and the decrypted TSN matches the stored TSN, full decryption begins at referenced 176. At reference 178 the comparator checks for a match between the CIC on the storage medium 20 and the CIC decrypted from the OTN. A failed match causes a return to step 170. A successful match at reference 180 may result in the reload processor 56 determining which purse 26 to load if more than one purse 26 is available. This can be part of the information encrypted in the OTN. Next, at reference 184, the reload processor 56 determines whether adding the approved value will exceed a maximum balance. If yes, then the display is operated to present a suitable message at reference 186 which may also prompt the holder to remove the storage medium 20 from the reload device 56.

Should the approved load value not exceed the maximum card balance, the value is added and the TSN sequentially adjusted. Either may follow the other. According to the FIG. 6 embodiment the TSN is incremented at reference 188 and the value loaded to the purse 26 by the loader 60 at reference 190. Appropriate accompanying messages may also be displayed. For example at reference 192 the current balance and amount being loaded may be displayed. Next at reference 194 the new balance may be displayed. Generally at reference 196 the holder is instructed to remove the card and the reload transaction is completed at reference 198.

Figure 7:
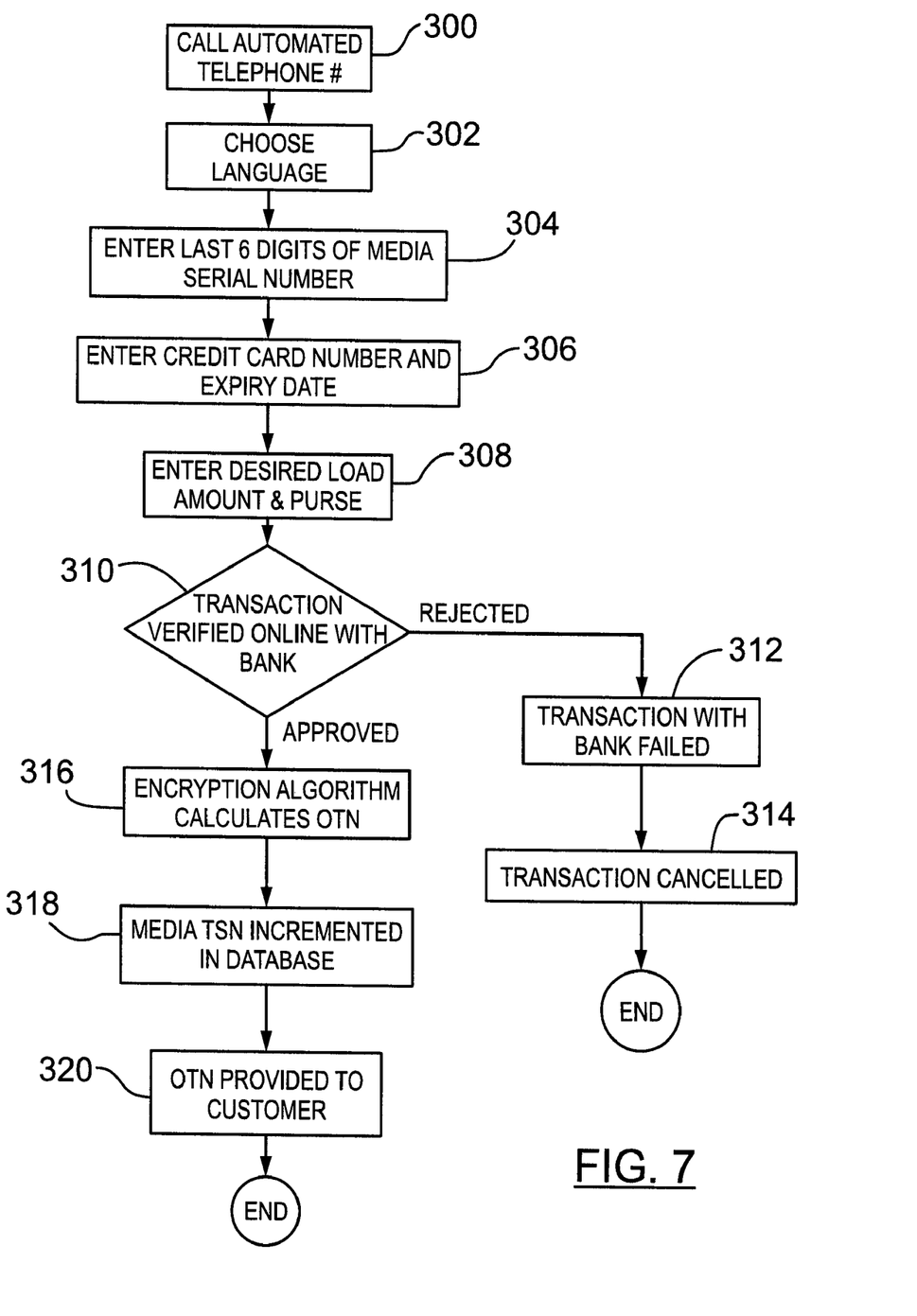
FIG. 7 is a flow chart illustrating a manner according to the present invention that an OTN may be provided to a holder.
Figure 8:
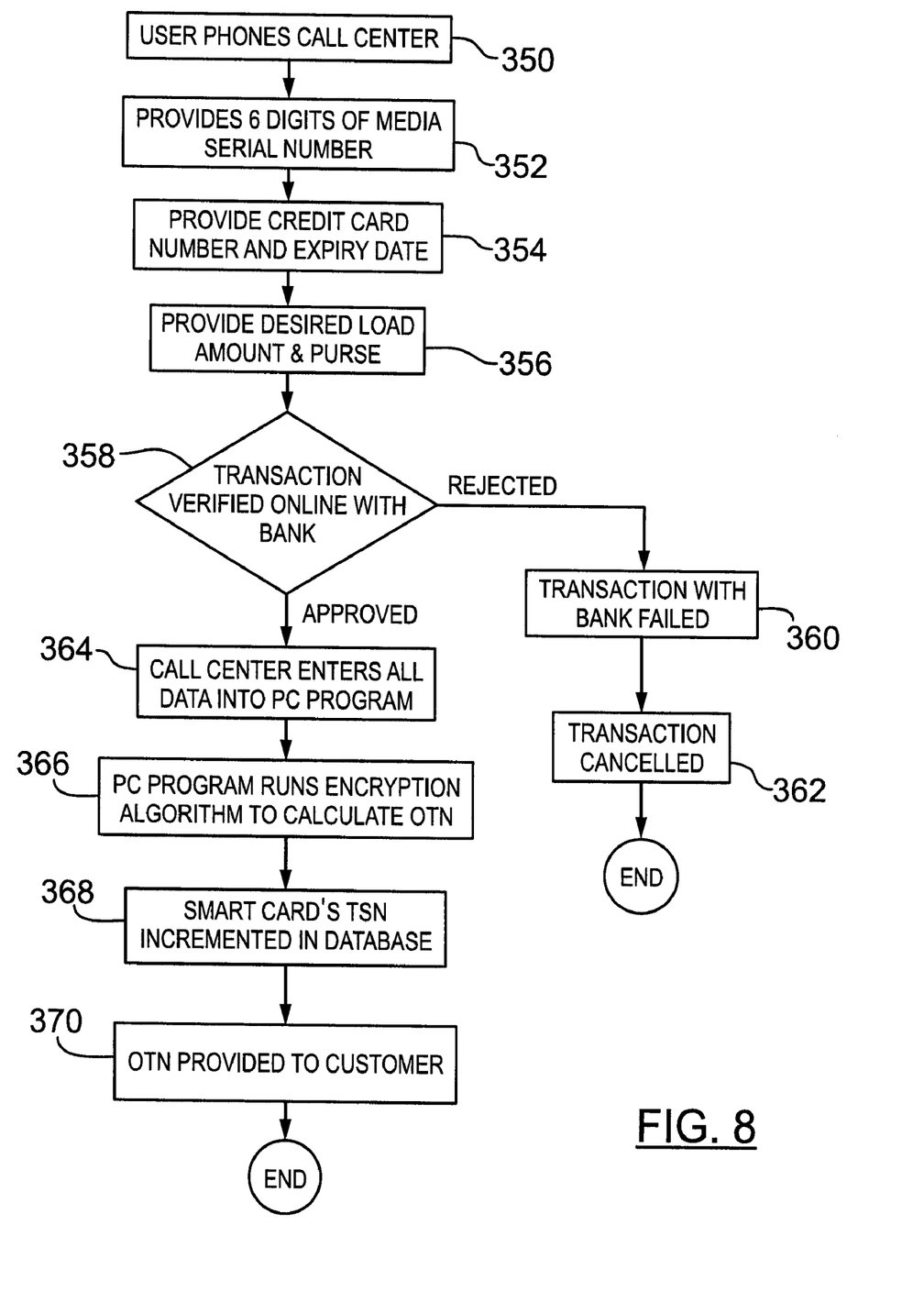
FIG. 8 is a flow chart illustrating an alternative embodiment of a way that an OTN may be provided to a holder.
Figure 9:
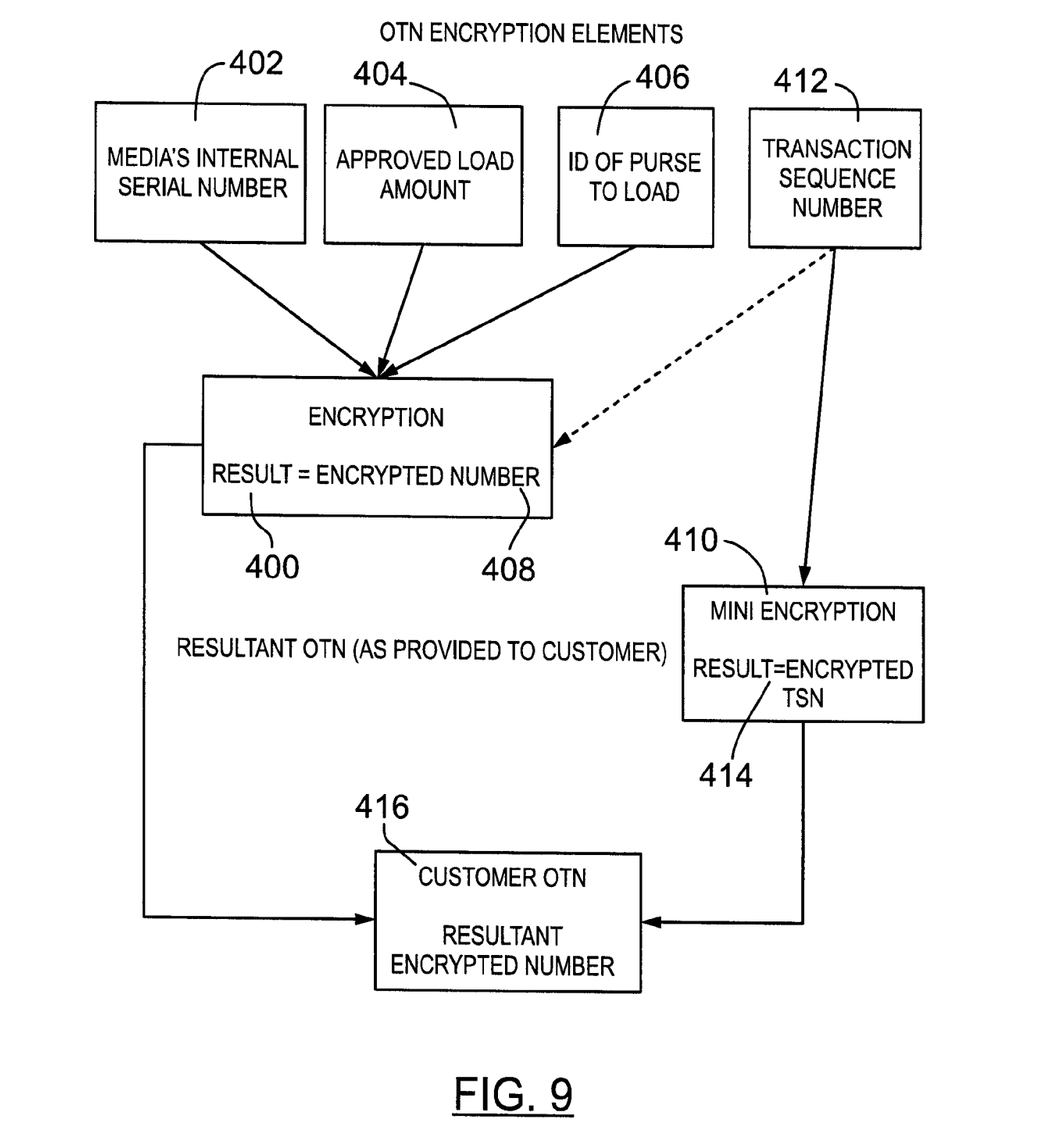
FIG. 9 is a block diagram illustrating OTN encryption elements.
Figure 10:
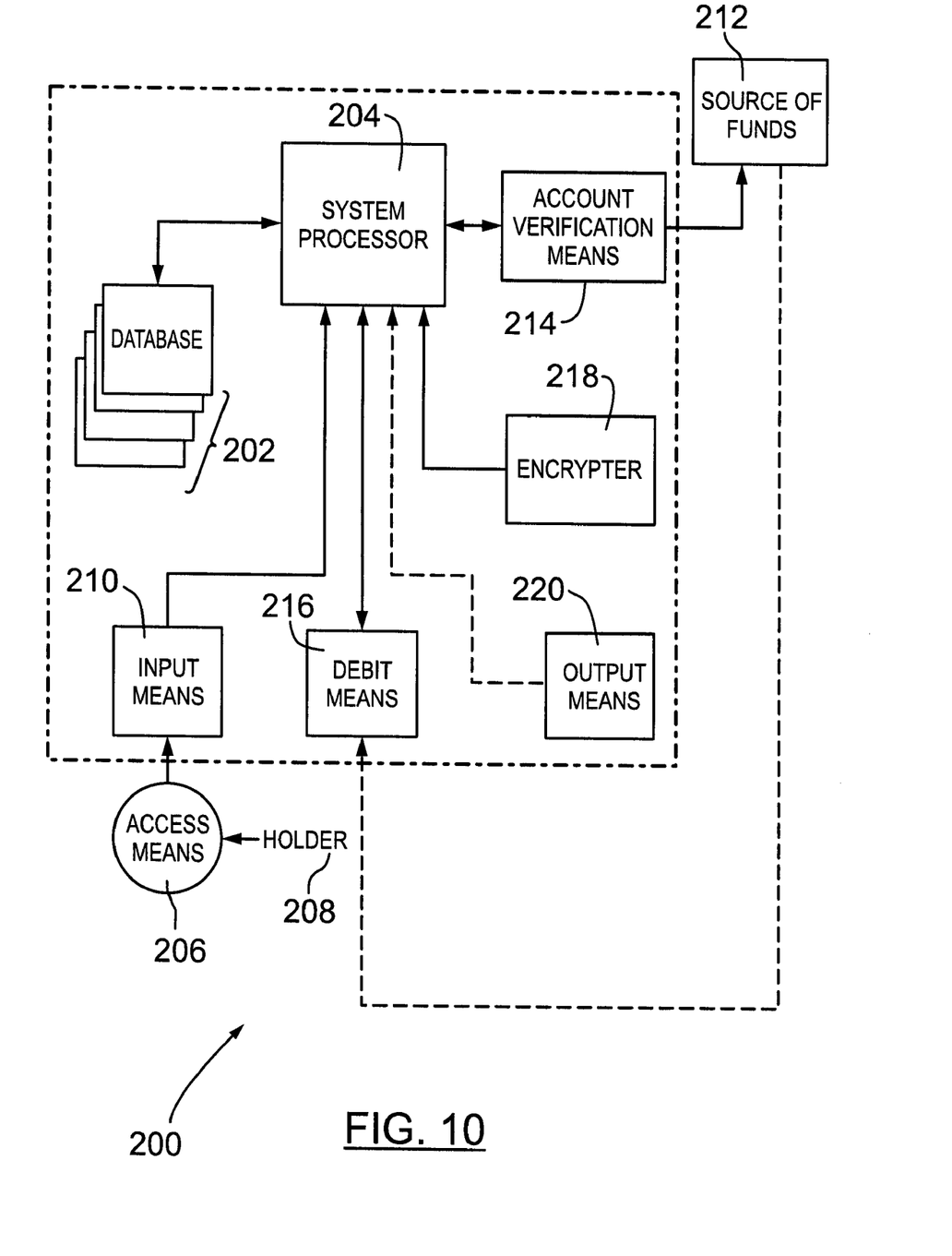
FIG. 10 is a schematic illustration of an OTN generator in accordance with the present invention; and, FIG. 11 is a flow chart illustrating a possible sequence of steps for resychronizing a TSN according to the present invention.

FIGS. 7 and 8 are flow charts illustrative of two ways that an OTN may be provided to the holder. FIG. 9 illustrates the OTN encryption elements. FIG. 10 is a schematic illustration of an OTN generator 200 in accordance with the present invention.

The OTN generator 200 has a database means 202 for storage and retrieval of information on account status associated with each storage medium 20 that has been issued and may include information on account status of the holder 208 as well as any other relevant account. The database 202 may further provide for storage and retrieval of CIC's for issued storage medium 20 and current TSN's associated with each CIC.

The OTN generator 200 has a system processor 204 which communicates with the database 202. Access means 206 are associated with the system processor to enable communication between a holder 208 of the storage medium 20 and the system processor 204. The access means 206 has input means 210 which may be fully automated for example relying on a computer hook-up over the Internet or utilizing touch tone features of a telephone handset. Alternatively (or additionally) the access means 206 may have input means 210 which uses human intervention such as a call centre wherein the call recipient has keyboard access to the system processor.

The input means 210 may prompt for and receive the CIC and a desired amount of value from the holder 208. As well the input means 210 may prompt for and receive a source of funds 212 selected by the holder 208 from where the value is to be obtained. The source of funds may for example be a credit facility or a bank account held by the holder 208. The credit facility may be a credit card company or the value supplier that controls the OTN generator 200.

Account verification means 214 may be associated with system processor 204 for determining whether the selected source of funds is in good standing. The account verification means may in turn communicate with the source of funds 212 or with the database 202 depending on whether current or historical data is to be verified.

Debit means 216 are associated with the system processor 204 for enabling the system processor 204 to debit the source of funds 212 by an amount corresponding to the desired value and possibly also a service or transaction charge.

An encrypter 218 is associated with the system processor 204 for generating the OTN according to an encryption algorithm. As discussed above, the encryption algorithm would typically be based on at the CIC, TSN and the desired amount of value. The encryption algorithm may also take into account which purse 26 is selected if more than one is available.

The system processor 204 may be configured to signal the encrypter to generate an OTN which will cause the reload device 50 to generate an error message if the account is not in good standing. Alternately the OTN may communicate an appropriate message to the holder 208 through the access means 206 should this be the case.

The system processor 204 may be further configured to signal the encrypter to generate a valid OTN and to communicate the OTN to the holder through the access means 206. Output means 220 may be provided in communication with the system processor 204 to link the system processor 204 with the access means 206. The input means 210 and output means 220 may be incorporated in a common element of the OTN generator 200.

The system processor 204 is further configured to update the database to adjust the TSN associated with the CIC of the storage medium 20 to be loaded by a predetermined increment. The predetermined increment will be the same for the OTN generator 200 as for the reload device 50.

FIG. 7 illustrates how an OTN may be generated with the OTN generator 200 in an automated telephone system configuration. At reference 300 the holder 208 calls an automated telephone number. The holder 208 may be prompted to and may choose a language preference at reference 302. At reference 304 the holder 208 is prompted for and enters, using a telephone keypad, the CIC number. The holder 208 is then prompted for and enters a credit card number and expiry date at reference 306. At reference 308 the holder 208 is prompted for and enters a desired load amount, and, if applicable, a selected purse 26.

The system processor 204 verifies the availability of funds at reference 310 through the account verification means 214. Should the verification fail, as indicated at reference 312, the transaction is cancelled as indicated by reference 314.

Should the verification be successfully approved, the system processor 204, using the encrypter 218, generates an OTN at reference 316. The system processor further increments the TSN in the database 202 at 318 and provides the OTN to the holder at reference 320.

It will be appreciated that the above sequence may be varied to some extent. For example the load amount and purse may be entered before the credit card information. Also the TSN may be incremented after the OTN is provided to the card holder 208.

FIG. 8 is a flow chart illustrating the generation of an OTN using a call centre as the access means 206. The holder 208 phones the call centre at reference 350 and provides, possibly upon prompting, the CIC at reference 352. The holder 208 is further prompted for and provides a credit card number and expiry date at reference 354 and a desired load amount and purse 26 at reference 356. The holder 208 would supply the foregoing information to a call centre operator who has input means 210 for inputting the information into the system processor 204.

The system processor 204 may verify the transaction with the source of funds 212 at reference 358. Although it is expected that in most cases the system processor 204 would be a computer, it may be possible to use a human operator as the system processor 204 as long as access is provided to the peripheral components of the OTN generator 200 which communicate with the system processor 204.

Should verification result in a denial, as shown at reference 360, the transaction is cancelled at reference 362 and the holder 208 may be informed accordingly.

Should verification prove successful and result in acceptance, the call centre at reference 364 enters the data into the system processor which at reference 366 runs the encrypter 218 to calculate the OTN. This may further require accessing the database 202 to obtain the current TSN. The call centre provides the OTN to the holder 208 at reference 370, the TSN is incremented in the database 202 at reference 368 and the transaction is complete.

FIG. 9 is a schematic diagram illustrating one manner in which an OTN may be encrypted. Two encryptions are illustrated. In a first encryption 400, elements of the CIC, approved load amount and desired purse are loaded at references 402, 404 and 406 respectively. The first encryption yields a first result 408. A second encryption occurs at reference 410 and is based on the TSN which is loaded at 412. The second encryption encrypts the TSN to yield encrypted TSN 414. The encrypted TSN 414 is combined with the first result 408 to yield a resultant OTN 416 which is the OTN provided to the holder 208.

Figure 11:
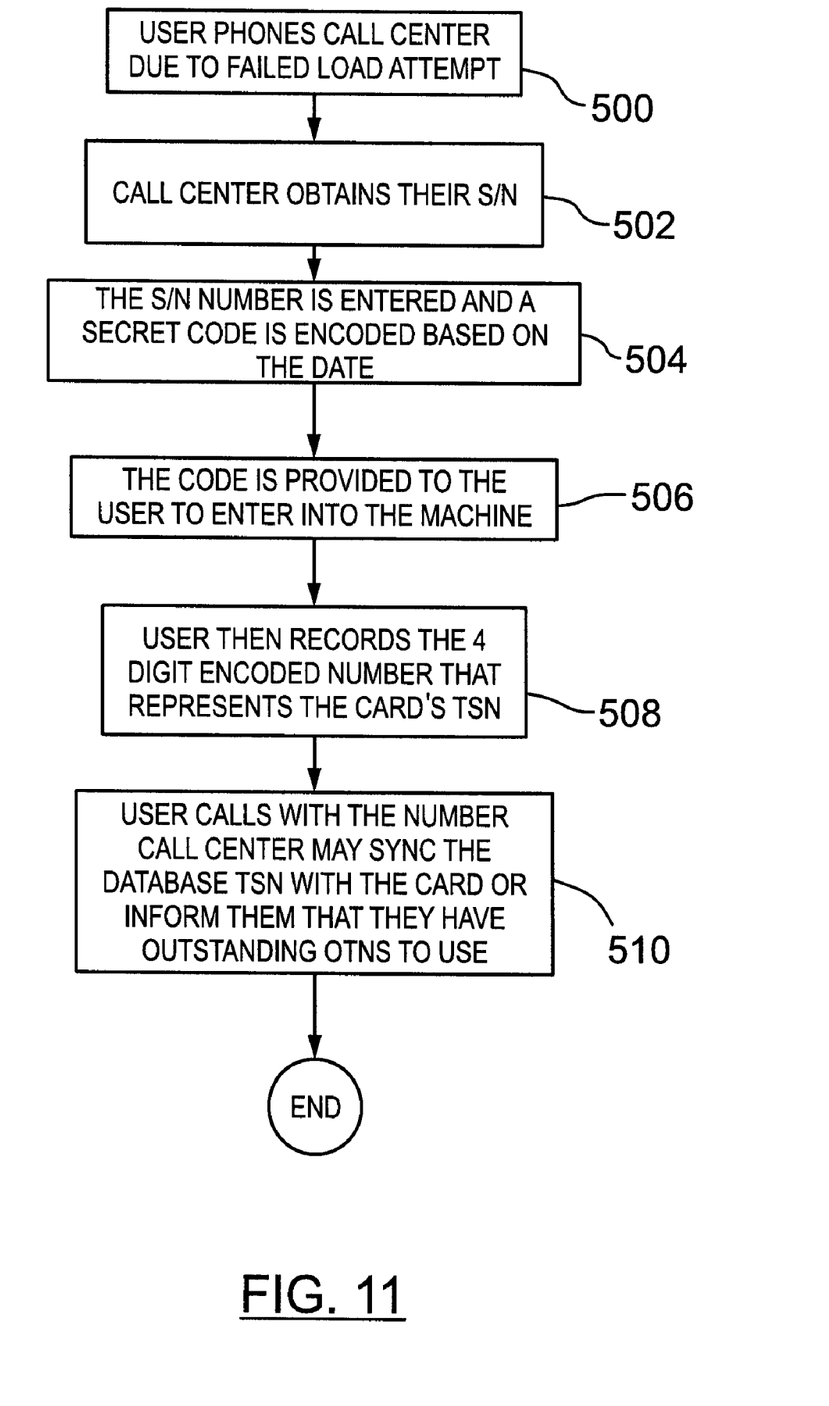

FIG. 11 is a flow chart illustrating a possible sequence of steps for resynchronizing a TSN when a load attempt fails. At reference 500, the holder 208 calls a call centre to report a failed attempt. The call centre obtains the CIC and at reference 502 determines the TSN. The TSN may be encrypted at reference 504 for example using the encrypter 218 and the encrypted TSN is provided to the holder 208 at reference 506. The user records the encrypted TSN at reference 508 and the call centre may, at reference 510 synchronize the database with the new TSN.

Reload devices 50 of the above type may be owned by different issuing organizations, each of which will have their own OTN generator 200. Should this be the case, provision will be required to separate one organization's storage media 20 and reload devices 50 from those of another. This may be accomplished for example by having an organization identifier as part of the purse address.

The above description is intended in an illustrative rather than a restrictive sense. Variations may be apparent to those skilled in the art without departing from the spirit and scope of the invention as defined by the claims set out below. For example it may not be necessary to follow the exact sequence of steps described or to use the exact encryption methodology. Variations to these and other aspects will no doubt be apparent to those skilled in the relevant arts.

What is claimed is:

1. A method for a value supplier to transfer value to an electronic purse possessed by a holder without requiring direct electronic communication between said value supplier and said electronic purse, said method comprising the steps of:

(i) storing in a storage medium, a Card Identification Code, a machine readable and reconfigurable Transaction Sequence Number and at least one said purse wherein each said purse is a machine readable reconfigurable storage means and has a unique purse address for identifying each said purse;

(ii) recording by a value supplier computer said Transaction Sequence Number in relation to said Card Identification Code in a reconfigurable data storage and retrieval system;

(iii) receiving by said value supplier computer a request from said holder including said Card Identification Code, a purse address, a desired value and payment instructions;

(iv) comparing by said value supplier computer said Transaction Sequence Number stored in said data storage and retrieval system against the Card Identification Code presented in step (iii);

(v) generating by said value supplier computer, using an encryption algorithm, a unique One Time Number incorporating said Card Identification Code, said Transaction Sequence Number, said purse address and said desired value;

(vi) transmitting by said value supplier computer said One Time Number to said user;

(vii) updating by said value supplier computer said Transaction Sequence Number in said storage and retrieval system to vary said Transaction Sequence Number by a predetermined increment;

(viii) providing a reload device having a reader for reading said Transaction Sequence Number from said portable storage medium, Card Identification Code input means for receiving said Card Identification Code from said storage medium, One Time Number input means for receiving said One Time Number from said holder, a decrypter having a decryption algorithm corresponding to said encryption algorithm in step (v) for decrypting said One Time Number into its Identification Code, Transaction Sequence Number, purse address and desired value components, a verifier for verifying that said Card Identification Code and Transaction Sequence Number on said storage medium accord with said One Time Number input by said holder and a loader for loading value into said at least one purse corresponding to said desired value;

(ix) receiving said storage medium in said reload device;

(x) determining by said reload device said Card Identification Code and Transaction Sequence Number on said storage medium, said desired value, said purse address and said One Time Number;

(xi) decrypting by said reload device said One Time Number using said decryption algorithm;

(xii) verifying by said reload device whether said Card Identification Code and Transaction Sequence Number components of said One Time Number conform to said Transaction Seauence Number and said Card Identification Code on said storage medium;

(xiii) based on said verifying in step (xii) determining conformance, identifying using said purse address the corresponding purse, loading said desired value into the purse identified by said purse address and incrementally adjusting said Transaction Sequence Number on said storage medium by said predetermined increment in step (vii).

2. The method of claim 1 including the further steps of:

(xv) configuring said reload device to monitor a predetermined number of retries of steps (ix) through (xii) for a given of said storage medium and, should said retries all fail to yield a determination of said conformance to enter a "disabled" indicator on said storage medium; and, (xvi) further configuring said reload device to check for a said disabled indicator and if detected, to refuse to load said purse and to display an error message to said holder upon receiving said storage medium.

3. The method of claim 2 wherein:

said payment instructions received in step (iii) include payment issuer information;

said payment instructions are confirmed with said issuer prior to continuing;

should payment be refused by said payment issuer either refusing to continue and notifying said holder.

4. The method of claim 3 wherein said loader loads said value onto said purse according to said payment instructions in all cash increments requested by said holder that are confirmed by said payment issuer.

5. The method of claim 1 comprising operating said reload device only offline and without using cash.

6. The method of claim 1, the value supplier computer being at a location remote from said reload device, comprising running said encryption algorithm using said value supplier computer to generate said One Time Number.

* * * * *